May 5, 1953

H. C. FITZSIMMONS 2,637,491

SEALING MEANS FOR FEED AND DISCHARGE CONDUITS
OF CENTRIFUGAL SEPARATOR BOWLS

Filed Feb. 4, 1950

INVENTOR.
HAROLD C. FITZSIMMONS
BY Hugo A. Kemman
ATTORNEY

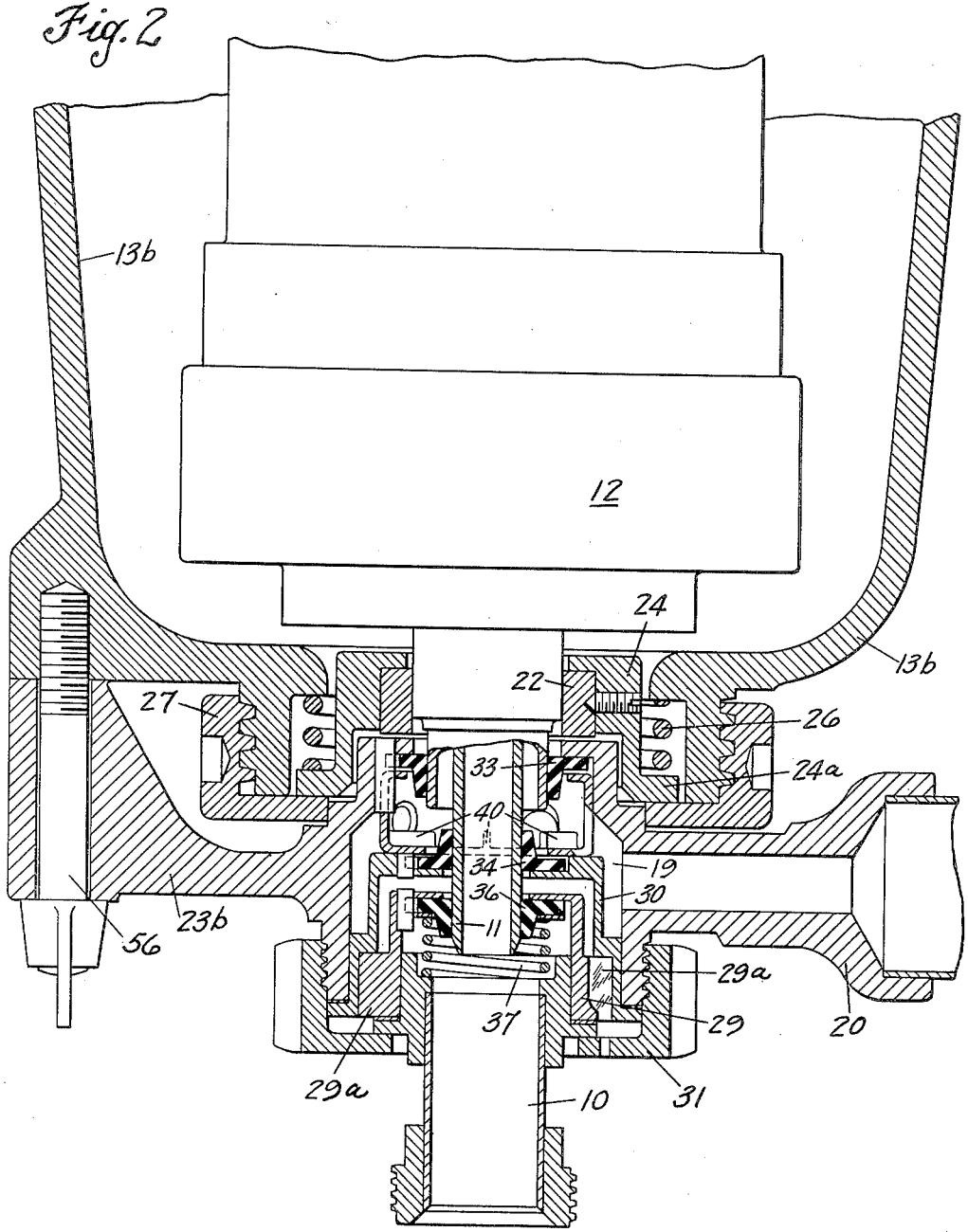

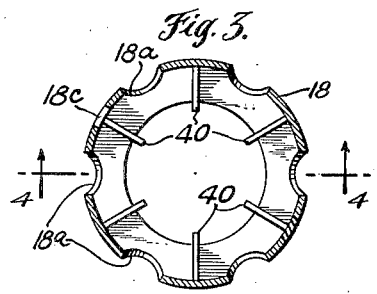
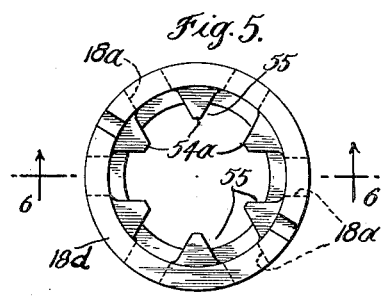
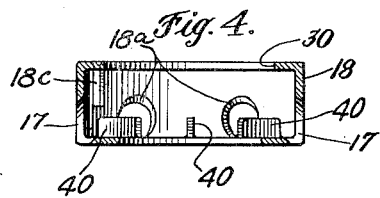
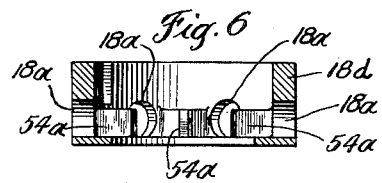
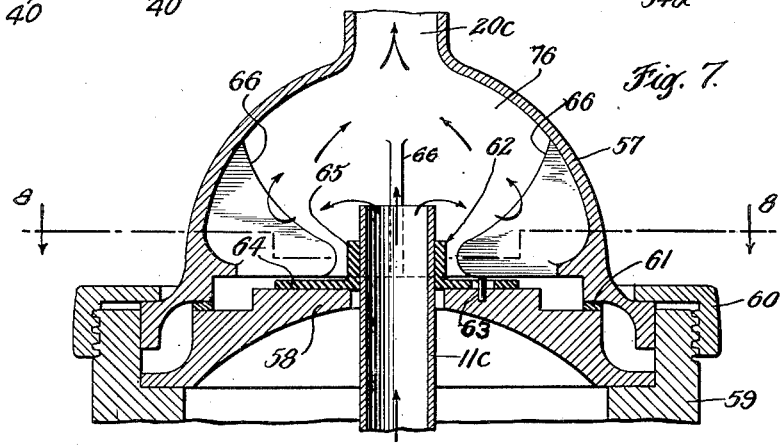
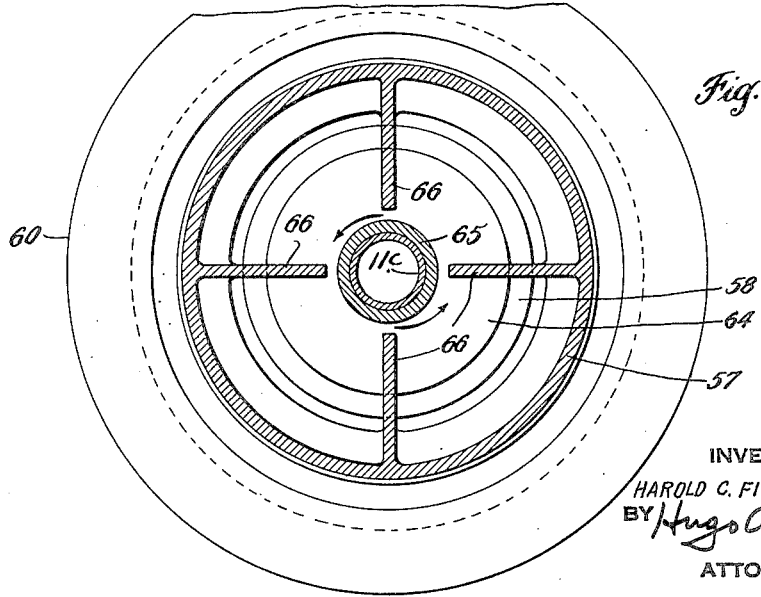

Patented May 5, 1953

2,637,491

UNITED STATES PATENT OFFICE 2,637,491

SEALING MEANS FOR FEED AND DISCHARGE CONDUITS OF CENTRIFUGAL SEPARATOR BOWLS

Harold C. Fitzsimmons, West Chester, Pa., assignor to The Sharples Corporation, a corporation of Delaware Application February 4, 1950, Serial No. 142,376

7 Claims. (Cl. 233—21)

This invention relates to centrifuges, particularly to centrifuges which employ fluid sealing means between the rotating and non-rotating parts, and has for an object the prevention, or substantial reduction, of leakage through or around such sealing means.

The desirability of providing a seal around the tubular extension of a high-speed rotor in order that fluid may be directed away from the rotor and into a stationary discharge conduit has heretofore been recognized, and sealing elements made of soft rubber, or some rubber-like material, in close contact with such high-speed extensions have been utilized. Such sealing elements have been shown and described in the United States patent to Jones, No. 2,435,941. Under some conditions difficulty has been experienced with such seals, however, because of leakage of the fluid or liquid between the sealing element and the rotating part or between the sealing element and the stationary conduit. Such leakage is substantially reduced, and in many cases wholly prevented, in accordance with the invention, by modifying the liquid flow in the vicinity of the sealing element.

The exact reason for the reduced leakage in accordance with the invention cannot be stated with absolute certainty because the leakage is caused by various factors whose relative importance is obscure. Vibration incidental to high-speed rotation may tend to cause such leakage by causing relative lateral movement between the aforesaid rotating and stationary parts, thereby repeatedly compressing the seal or causing it to slip on the stationary parts, but attempts to improve the condition by providing a floating seal in which the stationary parts are free to move laterally along with the rotor under vibration have not been wholly successful under certain conditions. On the other hand, while the rotary motion of the liquid as it leaves the high-speed rotor might appear helpful in minimizing such leakage since it throws the liquid away from the seal and toward the discharge conduit, it has been found in accordance with the invention that reduction of this rotary motion results in a substantial reduction in leakage even in the presence of vibration.

One of the factors contributing to the reduced leakage in accordance with the invention is explainable by the well-known Bernoulli theorem which states, in effect, that along a path of stream flow a region of high velocity is a region of low pressure. By reducing the high-velocity rotary movement of the fluid or liquid in the vicinity of the sealing element, the pressure on the seal is thereby increased. The seemingly paradoxical concept of increasing the liquid pressure on a sealing element in order to reduce the leakage therearound becomes understandable when it is noted that, first, the sealing element is so designed that liquid pressure thereon holds it firmly in contact with the extension of the high-speed rotor and with the stationary parts; and, second, that leakage induced by vibration is less likely to occur if the sealing member is thus firmly held in contact.

Further details of the invention will be described with reference to the accompanying drawings, in which:

Fig. 2 is a vertical sectional view of a portion of a type of centrifuge similar to Fig. 1 to which the invention has been applied, but with differently constructed parts differently identified;

Fig. 3 is a fragmentary horizontal sectional view taken substantially along the line 3—3 in Fig. 1;

Fig. 4 is a sectional view taken substantially along the line 4—4 in Fig. 3;

Fig. 5 is a horizontal plan view of a modification of the structure shown in Fig. 3;

Fig. 6 is a sectional view taken substantially along the line 6—6 in Fig. 5;

Fig. 7 is a vertical sectional view of a portion of still another type of centrifuge embodying the invention; and Fig. 8 is a sectional view taken substantially along the line 8—8 in Fig. 7.

Figure 1:
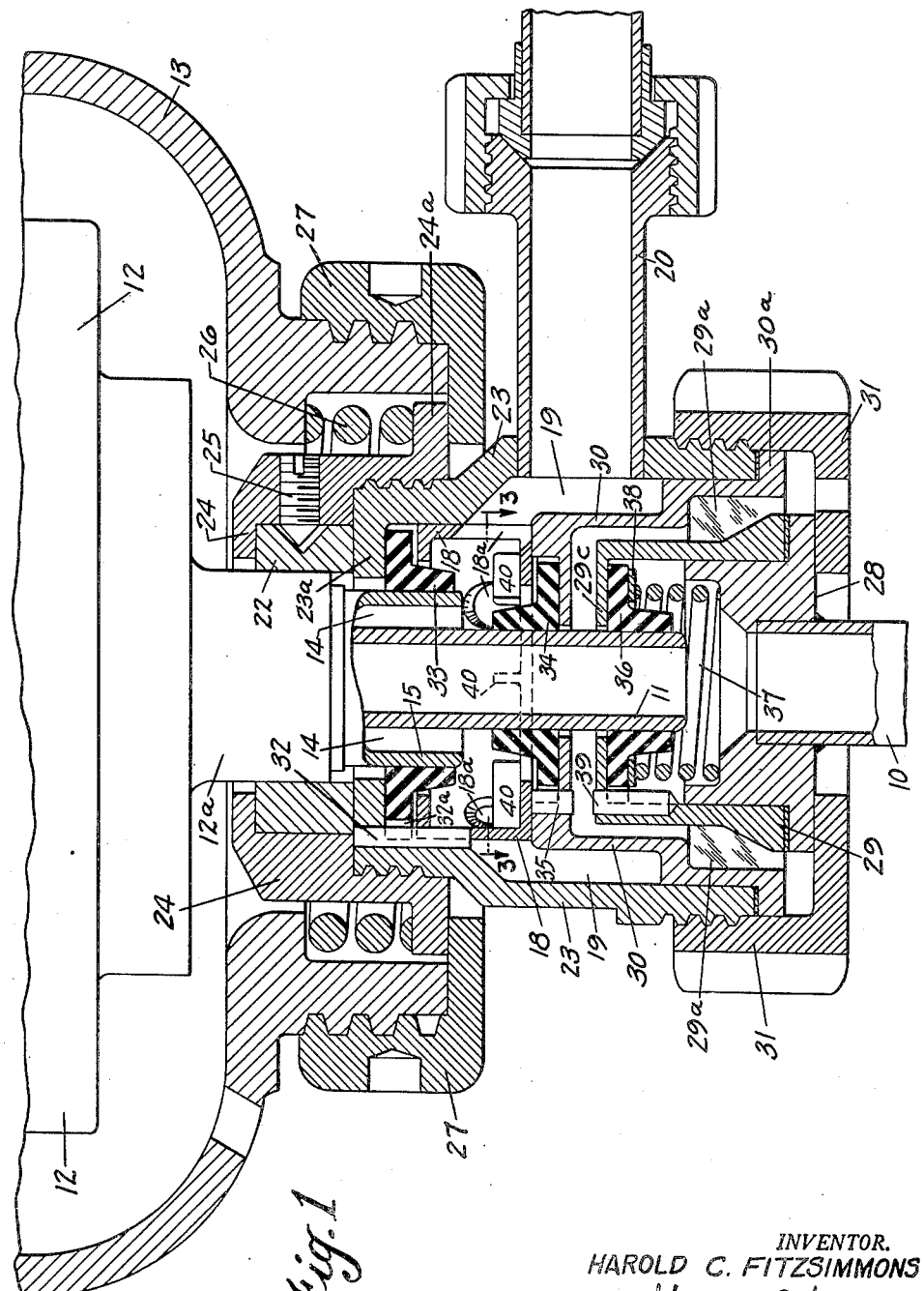
Fig. 1 is a vertical sectional view of a portion of a centrifuge embodying the invention.

Referring to the drawings, the invention has been shown in one form as applied to a centrifuge of the type disclosed in United States Letters Patent 2,435,941, Jones. In Fig. 1 liquid to be centrifugally treated passes upward through a non-rotating inlet conduit 10 into a hollow extension 11 of a rotor or bowl 12 which, with other parts not shown, are enclosed within housing 13. The rotor 12, which performs the usual functions of a centrifuge, and its extension 11 may be supported and driven at high speed from the upper end thereof by any suitable well-known means, such as shown in Bath Patent 1,750,154.

The liquid entering rotor 12 in an upward direction after being centrifuged passes downward through annular passageway 14 between extension 11 and tubular member 15 which may be constructed integrally with rotor 12. The liquid flowing downward from annular passageway 14 has a high rotary velocity, due to the rotation not only of rotor 12 but also due to rotation of extension 11 and member 15, as it enters an annular chamber formed by the walls of a collar 18. This liquid flows outward through holes 18a in collar 18 into annular chamber 19, thence out through discharge pipe or conduit 20 connecting therewith. Thus, the walls of the annular chamber 19 and those of collar 18 form a part of the outlet passageway or conduit for the liquid discharged from rotor 12.

The housing 13 may be supported in any suitable way such as by a floor pedestal of which it may be an integral part, as shown in said patent to Bath, No. 1,750,154. The rotor 12, supported and driven from its upper end, as shown in said Bath patent, has a downwardly extending boss 12a, shown as integral with member 15, journaled in a bearing or bushing 22 rigidly held between the upper flange of seal-housing 23 and the upper flange of cap 24 threaded thereon. A set screw 25 prevents relative rotation between bushing 22 and cap 24. The cap 24 is provided with a lower radial flange 24a in opposing relation with respect to a shoulder or flange of the stationary housing 13, a compression spring 26 being disposed therebetween to press the radial flange 24a of cap 24 downwardly against the inwardly extending flange of a nut 27. The nut 27 is threaded to the lower end of housing 13. While the cap 24 and the sub-assembly of associated parts connected thereto are restrained from rotary movement, clearance is provided at the periphery of its flange 24a for slight lateral relative movement with respect to the flange of nut 27 on housing 13. The sub-assembly of parts is known to those skilled in the art as a "drag assembly." The drag assembly moves as a whole with sliding movement of flange 24a on the flange of nut 27. The developed frictional opposition serves to damp vibrations and to oppose precession of the lower end of rotor 12.

The feed conduit 10 for the supply of liquid to the centrifuge with its permanently attached plug flange 22 fits into and against a cup-shaped member 29. This member 29 in turn fits into and has wings 29a whose upper ends bear against a shoulder of a cup-shaped member 30. The member 30 has a lower radial flange 30a engaging the lower end of seal-housing 23, a gasket being shown interposed therebetween.

The parts 28, 29 and 30 are all secured to the seal-housing 23 by a nut 31 which is threadedly secured to the lower end of seal-housing 23. A lower radial flange of nut 31 presses against the plug flange 22 secured to feed conduit 10. Thus, the drag assembly includes all of the foregoing parts which are secured to seal-housing 23. The collar 18, shown in detail in Figs. 3 and 4 fits into the upper end of housing 23 and has lower inturned flanges resting upon the upper surface of the cup-shaped member 30 and is provided with a vertical wall-slot 18c (Figs. 3 and 4) into which a pin 32 Fig. 1. extends from a press fit in seal-housing 23 to prevent rotation.

The sealing means for preventing leakage of the above-mentioned liquid will now be described. First, it is desired to prevent leakage between seal-housing 23 and rotating tubular member 15. To this end an annular seal 33 is positioned between the upper radial flange 23a of the seal-housing 23 and the upper radial flange of collar or member 18. The latter flange serves to support seal 33 with the machine at rest. Any suitable support may be used in place of collar 18, which collar in that event will be omitted.

The dimensions are such that there is a greater axial space between the upper flange of collar 18 and flange 23a than the thickness of the radial flange of seal 33, thus providing a clearance when the nut 31 is tightly drawn up. Hence, the radial flange of annular seal 33 is not under axial compression, the dimensional clearance provided between it and the flange 23a being of the order of one thirty-second of an inch as determined by the axial length of the collar 18. Seal 33 of the so-called "hat type" may be made of any suitable flexible and elastic material, such as rubber or the rubber-like material commonly known as "neoprene." It is proportioned to fit snugly but not tightly around the whole periphery of rotating tubular member 15, and it has a depending lip or annular portion which will be urged against member 15 by the pressure of the liquid in the outlet, the passageway or chamber. Likewise, the radial flange portion of seal 33, which radial flange portion as will be noted extends laterally outward from and around a section of said depending lip or annular portion of said seal 33, e. g. around one end thereof as shown, will be held against flange 23a of seal-housing 23 by the pressure of liquid in the outlet chamber or passageway. Rotation of seal 33 is prevented by engagement of the sides of a slot 32a formed therein with the pin 32.

Next, it is desired to prevent leakage of liquid between the extension 11 and the upper flange of cup-shaped member 30. To this end, a seal 34, similar to seal 33, is supported upon the upper radial flange of member 30 and below the lower radial flange of collar or member 18. The depth of a seal-receiving recess formed in the upper flange of member 30 is approximately a thirty-second of an inch greater than the thickness of the radially extending flange of seal 34 to provide clearance. The seal 34 may be made of the same material as seal 33. Its upwardly extending lip or annular portion is likewise urged against extension 11 by the pressure of liquid and its radial flange. i. e. its portion extending laterally outward from and around a section of its annular portion (the lower end as shown) is urged against the radial flange of member 30 by the same pressure. Rotation of seal 34 is prevented by engagement of the sides of a slot formed therein with a pin 35 extending from member 30. The present invention is particularly concerned with prevention of leakage at seal 34.

Next it is desired to prevent leakage of feed liquid between extension 11 and the radial flange 29c of cup-shaped member 29 as the liquid passes upward from feed or inlet conduit 10 into rotating extension 11. For this purpose a seal 36, similar to seals 33 and 34, is positioned against the under side of the upper radial flange 29c of cup-shaped member 29. Seal 36 may also be made of rubber, or some rubber-like material, with a depending lip or annular portion adapted to be urged against the periphery of extension 11 by liquid pressure in the annular inlet chamber, and with a radial flange as described adapted to be held against not only flange 29c by the same liquid pressure, but also by the elastic compression of a spring 37, the lower end of which engages an annular seat of plug flange 28 and the upper end of which engages and presses against washer 38 which engages the radial flange of seal 36. Rotation of seal 36 is prevented by a pin 39, press-fitted in cup-shaped member 29, engaging a slot formed in the radial flange of seal 36.

The seals 33, 34 and 36 have a slight amount of radial clearance at the peripheries of their radial flanges and since not frictionally restrained from movement with the non-rotating parts, they are self-aligning, that is, slidable with respect to such parts with lateral movement of extensions 11 and 15 of rotor 12 relative to the drag assembly. Since outlet conduit 20 is secured to seal-housing 23, it is provided with some flexibility as by including flexible tubing as part thereof, but it also has adequate strength to prevent rotation of the drag assembly.

As described in said Jones Patent 2,435,941, there is maintained a superatmospheric liquid pressure throughout the outlet passageway due to the centrifugal force on the liquid and due to flow resistance and/or static head developed in outlet conduit 20. In consequence, the seals 33 and 34 are pressed against their associated rotating and non-rotating surfaces. In accordance with the present invention, leakage which has heretofore occurred at seal 34 has been overcome by changing the character of flow of the liquid in the outlet passage, particularly in the vicinity of seal 34. By means of stationary baffles 40, shown more in detail in Figs. 3 and 4, the rotary motion of the liquid in the region of seal 34 is reduced. Since the liquid leaving rotor 12 flows in passageway 14 between rotating tubular member 15 and rotary extension 11, the tendency is for the liquid to rotate at high speed as it leaves the passageway 14. Under the resulting flow conditions there has been at times leakage at the seal 34, but with the stationary baffles 40, that leakage stopped. The seal 34 is either more firmly held against rotor extension 11 and the upper flange of member 30 or the force tending to force the liquid past seal 34 is reduced as a result of the provision of the baffles 40. The baffles 40 may be fastened to collar 18 in any suitable manner as by welding, or they may be fastened to another non-rotating part, as to the upper flange of cup-shaped member 30.

Referring to Figs. 5 and 6, a modified form of collar 18d may be utilized in the centrifuge shown in Figs. 1 or 2 instead of collar 18, if desired. Collar 18d may be formed in one piece by milling slots 55 therein to form wedge-shaped baffles 54a, slots 55 terminating in holes 18a for the flow of liquid outward to chamber 19. The collar shown in Figs. 5 and 6 will be more rugged than that shown in Figs. 3 and 4 and in practice has been found to be effective in preventing leakage.

Referring to Fig. 2, like reference characters refer to like parts as shown in Fig. 1, while reference characters having the suffix b in Fig. 2 represent parts substantially like the corresponding parts shown in Fig. 1. It is thus unnecessary to describe in detail all of the structure shown in Fig. 2. The most significant difference in the construction of Fig. 2 is due to seal-housing 23b being rigidly secured to housing 13b by suitable fastening means such as the screw 56 so that the parts rigidly secured to housing 23b remain stationary. However, the flange 24a of cap 24 under pressure of spring 26 can move in transverse directions and perform its damping functions. There is also limited transverse movement of seals 33, 34 and 36 with corresponding movement of extension 11 and outlet member or conduit 15. Notwithstanding the greater relative movements of the seals 33, 34 and 36 relative to the now stationary parts 29, 30 and 23b representing an additional potential cause of leakage in the construction shown in Fig. 2, it has been found that baffles 40 will effectively prevent the leakage that otherwise might occur therein.

Referring to Figs. 7 and 8 for a further exemplification of the invention, liquid from the rotor of a centrifuge, not shown, passes upward through outlet conduit 11c into chamber 76 and out through discharge conduit 20c. It is to be understood that the conduit 11c rotates with the rotor at a high velocity, the latter being driven by any suitable source of power, not shown. Chamber 76 is formed by dome 57 and plate 58 which are held together and to frame 59 by nut 60 threaded to frame 59. Gasket 61 interposed between dome 57 and plate 58 prevents leakage therebetween. Further details of centrifuges of this type are shown in the pending application for patent of Leo D. Jones for Fluid Conduit Connections to Centrifugal Machines, Serial No. 724,311, now Patent 2,554,622, dated May 29, 1951, and owned by the assignee of the present application.

To prevent leakage between plate 58 and conduit 11c, seal 62, similar to seals 33, 34 and 36, is provided and is prevented from rotating by pin 63 which may be press-fitted in plate 58. Seal 62 comprises a radial flange 64 adapted to be held firmly against the upper surface of plate 58 by the pressure of liquid in chamber 76 and an upwardly extending lip or annular portion 65 adapted to be held firmly against conduit 11 by the same pressure.

As thus far described, undesirable leakage may occur through or around seal 62. To prevent such leakage, baffles 66 are formed within dome 57 in the path of rotary flow of the liquid emerging from conduit 11c.

While preferred embodiments of the invention have been described, it will be understood that modifications thereof may be made within the spirit and scope of the invention as set forth in the appended claims.

What is claimed is:

1. The combination comprising a cylindrical-shaped object, an elastic sealing member having an annular portion surrounding and engaging said cylindrical-shaped object, a chamber about said sealing member, said sealing member having a portion extending laterally outward from and around a section of said annular portion, said laterally extending portion of said sealing member engaging a surface of said chamber to form with said annular portion a seal between said cylindrical-shaped object and said chamber, means causing rotation in said chamber of liquid about the axis of said cylindrical-shaped object, and baffles in said chamber positioned about said annular portion of said sealing member and transversely of the rotation of said liquid to reduce the rotation of said liquid about said sealing member.

2. The combination comprising a rotatable tubular member, means for rotating said tubular member, an elastic sealing member having an annular portion surrounding and engaging said tubular member, a stationary chamber about said sealing member, said sealing member having a portion extending laterally outward from and around a section of said annular portion, said laterally extending portion of said sealing member engaging a surface of said stationary chamber to form with said annular portion a seal between said tubular member and said chamber, means for maintaining said sealing member non-rotatable, means causing rotation in said chamber of liquid about the axis of said tubular member, and baffles in said chamber positioned about said annular portion of said sealing member and transversely of the rotation of said liquid to reduce the rotation of said liquid about said sealing member.

3. The combination comprising a rotatable tubular member, a rubber-like sealing member having an annular portion surrounding and engaging said tubular member, a stationary chamber about said sealing member, said sealing member having a portion extending laterally outward from and around a section of said annular portion, said laterally extending portion of said sealing member engaging a surface of said stationary chamber adjacent said tubular member to form with said annular portion a seal at the juncture of said tubular member and said chamber, a second rotatable tubular member surrounding said first tubular member and forming a passage therebetween, said passage entering said chamber, means for rotating said tubular members, means for feeding liquid into said first tubular member and for discharging liquid in rotating condition into said chamber through said passage, and baffles in said chamber positioned about said annular portion of said sealing member and transversely of the rotation of said liquid to reduce the rotation of said liquid about said sealing member.

4. The combination with a centrifuge bowl of a feed tube fixed to and rotatable with said bowl, an elastic sealing member having an annular portion surrounding and engaging said feed tube, a stationary liquid receiving chamber about said sealing member and said feed tube, said sealing member having a portion extending laterally outward from and around a section of said annular portion, said laterally extending portion of said sealing member engaging a surface of said chamber extending laterally about and contiguous to said feed tube to form with said annular portion a seal between said feed tube and said chamber, a second tube fixed to and rotatable with said bowl and positioned about said feed tube, said second tube being of sufficiently larger diameter than said feed tube to form a liquid discharge passage therebetween, said discharge passage entering said chamber, means for discharging liquid from said bowl in rotating condition through said passage into said chamber, and baffles in said receiving chamber positioned about said annular portion of said sealing member and transversely of the rotation of said liquid to reduce the rotation of said liquid about said sealing member.

5. The combination of claim 4 in which the sealing member is rubber-like.

6. The combination with a centrifuge bowl having concentric inlet and outlet passages at one end thereof, and a stationary liquid receiving chamber about said inlet passage communicating with said outlet passage, of a non-rotatable elastic sealing member in said receiving chamber having an annular portion surrounding and in contact with the exterior of said inlet passage, said sealing-member having a laterally extending portion integral with said annular portion and extending around a section of said annular portion, said laterally extending portion being in contact with a surface of said receiving chamber, and radially positioned baffles in said receiving chamber positioned about said annular portion of said sealing member.

7. The combination of claim 6 in which the sealing member is rubber-like.

HAROLD C. FITZSIMMONS.

References Cited in the file of this patent

UNITED STATES PATENTS

| Number | Name | Date |
| --- | --- | --- |
| 1,806,929 | Bath | May 26, 1931 |
| 2,145,541 | Forsberg | Jan. 31, 1939 |
| 2,147,691 | Cramton | Feb. 21, 1939 |
| 2,302,578 | Serrell | Nov. 17, 1942 |
| 2,435,941 | Jones | Feb. 10, 1948 |
| 2,554,622 | Jones | May 29, 1951 |

FOREIGN PATENTS

| Number | Country | Date |
| --- | --- | --- |
| 570,633 | Great Britain | July 17, 1945 |